United States Patent
Goll et al.

(10) Patent No.: US 10,533,679 B2
(45) Date of Patent: Jan. 14, 2020

(54) ELECTROMAGNETIC ACTUATING DRIVE FOR CARRYING OUT A LINEAR MOVEMENT

(71) Applicant: VOITH PATENT GMBH, Heidenheim (DE)

(72) Inventors: Armin Goll, Salzgitter (DE); Stefan Lehmann, Leutershausen (DE); Steffen Lindörfer, Schrozberg (DE)

(73) Assignee: VOITH PATENT GMBH, Heidenheim (DE)

( * ) Notice: Subject to any disclaimer, the term of this patent is extended or adjusted under 35 U.S.C. 154(b) by 100 days.

(21) Appl. No.: 15/755,170

(22) PCT Filed: Sep. 26, 2016

(86) PCT No.: PCT/EP2016/072824
§ 371 (c)(1),
(2) Date: Feb. 26, 2018

(87) PCT Pub. No.: WO2017/055208
PCT Pub. Date: Apr. 6, 2017

(65) Prior Publication Data
US 2018/0245707 A1  Aug. 30, 2018

(30) Foreign Application Priority Data
Sep. 29, 2015  (DE) .................... 10 2015 116 464

(51) Int. Cl.
*H01F 7/16* (2006.01)
*F16K 31/06* (2006.01)
(Continued)

(52) U.S. Cl.
CPC ...... *F16K 31/0675* (2013.01); *F16K 37/0041* (2013.01); *H01F 7/081* (2013.01);
(Continued)

(58) Field of Classification Search
CPC ............ F16K 31/0675; F16K 37/0041; H01F 2007/086; H01F 2007/163;
(Continued)

(56) References Cited

U.S. PATENT DOCUMENTS 4,270,726 A    6/1981  Hertfelder et al.
4,604,600 A *  8/1986  Clark ...................... H01F 7/13
                                                  335/261
(Continued)

FOREIGN PATENT DOCUMENTS

CN        101299376 A      11/2008
CN        104011810 A      8/2014
(Continued)

*Primary Examiner* — Bernard Rojas
(74) *Attorney, Agent, or Firm* — Shumaker, Loop & Kendrick, LLP; James D. Miller

(57) ABSTRACT

An electromagnetic drive for implementing a linear motion includes an electromagnet having a coil, a core and an armature able to move linearly along a symmetrical axis of the core, wherein an air gap is formed between the core and the armature. With the objective of providing for simple, compact, cost-effective and flexible use of the electromagnetic drive in high-pressure systems as well as a concurrent exact positioning of the piston at any given position at optimized extension speed, it is provided for the air gap to exhibit a base and two limbs running symmetrically to the symmetrical axis as well as an essentially frustoconical cross-section in longitudinal section and for the limbs to be arranged relative to the symmetrical axis of the core so as to form an angle α.

16 Claims, 4 Drawing Sheets

(51) Int. Cl.
*H01F 7/08* (2006.01)
*F16K 37/00* (2006.01)

(52) U.S. Cl.
CPC .............. *H01F 7/088* (2013.01); *H01F 7/16* (2013.01); *H01F 7/1607* (2013.01); *H01F 2007/086* (2013.01); *H01F 2007/163* (2013.01); *H01F 2007/1661* (2013.01)

(58) Field of Classification Search
CPC .. H01F 2007/1661; H01F 7/081; H01F 7/088; H01F 7/16; H01F 7/1607
See application file for complete search history.

(56) References Cited

U.S. PATENT DOCUMENTS

| | | | | |
|---|---|---|---|---|
| 5,006,901 A | * | 4/1991 | Dick | ............ H01F 7/1607 137/625.65 |
| 5,066,980 A | | 11/1991 | Schweizer | |
| 5,547,165 A | * | 8/1996 | Brehm | ................ F16H 61/0251 251/129.16 |
| 6,386,220 B1 | * | 5/2002 | Koenings | ........... F16K 31/0613 137/15.21 |
| 6,918,571 B1 | | 7/2005 | Rose | |
| 8,581,683 B2 | * | 11/2013 | Hoppe | ................... H01F 7/081 251/129.15 |
| 2010/0308244 A1 | * | 12/2010 | Oikawa | ............... F16K 11/0716 251/129.15 |

FOREIGN PATENT DOCUMENTS

| | | |
|---|---|---|
| DE | 3638295 A1 | 5/1987 |
| DE | 102005056776 A1 | 6/2006 |
| DE | 102011056853 A1 | 6/2013 |
| DE | 102012200977 A1 | 7/2013 |
| DE | 102012106683 A1 | 1/2014 |
| DE | 102012108583 A1 | 3/2014 |
| GB | 82058467 A | 4/1981 |
| GB | 2184604 A | 6/1987 |
| JP | 2003007528 A | 1/2003 |

* cited by examiner

ELECTROMAGNETIC ACTUATING DRIVE FOR CARRYING OUT A LINEAR MOVEMENT

CROSS-REFERENCE TO RELATED PATENT APPLICATIONS

This patent application is a United States national phase patent application based on PCT/EP2016/072824 filed Sep. 26, 2016, which claims the benefit of German Patent Application No. DE 10 2015 116 464.7 filed Sep. 29, 2015, the entire disclosures of which are hereby incorporated herein by reference.

FIELD

The invention relates to an electromechanical transducer, in particular an electromagnetic actuating drive for implementing a linear motion.

BACKGROUND

Among other uses, electromagnetic drives are used to drive hydraulic slide valves, particularly for the opening and closing of valves. In this regard, a differentiation is made between low-pressure systems in the range of 3-25 bar, medium-pressure systems in the range of 25-65 bar and high-pressure systems in the range of 65-200 bar. Hydraulic valves operating as low-pressure systems in the range of approximately 10 bar are known in the prior art. Actuating drives for valves in low-pressure systems are larger and heavier than actuating drives in high-pressure systems.

From cost perspectives as well as technical perspectives, there is increasing need for new high-pressure system drives having smaller valves. Compared to low-pressure systems, high-pressure systems have the advantage of the fluids employed exhibiting lower pressure, turbulence and acceleration losses. Moreover, smaller components can be used in high-pressure systems, by which an optimizing of costs can likewise be achieved along with being able to save space. However, actuating drives in high-pressure systems must be able to apply greater forces relative to their dimensioning.

Actuating drives for high-pressure applications which use e.g. coils with a permanent magnet and are able to implement a bidirectional motion; i.e. the electric coil moves the permanent magnet in one or the opposite direction, are already known in the prior art. However, such drives are of relatively large dimensions. Smaller drives in the prior art are in turn not capable of providing the force necessary in high-pressure systems for the lifting axis to have sufficient power reserves against potential contaminants infiltrating the pressure medium.

As is known, an electromagnet of an actuating drive comprises a coil which generates a magnetic field via current as well as a core and an armature. The wire of a coil is routinely circularly coiled. The core of an electromagnet consists of a soft magnetic material, in the simplest case soft iron. The core serves in the bolstering and/or amplifying of the magnetic field. The armature of the electromagnet is ferromagnetic and is energized by the magnetic field generated by the coil and amplified by the core. The magnetic field formed between the armature and core exerts a force which is dependent on the air gap and/or distance formed between the armature and core and essentially corresponds to a hyperbolic characteristic; i.e. the smaller the distance between the core and armature, the stronger the magnetic force. This force increases essentially asymptotically as the distance between the core and armature decreases.

SUMMARY

With that in mind, the invention is based on the task of providing an electromagnetic drive of the type cited at the outset for implementing a linear motion, in particular a lifting motion, which enables simple, compact, cost-effective and flexible use in high-pressure systems as well as a concurrent exact positioning of the piston at any given position at optimized extension speed.

This task is solved by an electromagnetic drive as shown and described herein.

The electromagnetic drive according to the invention for implementing a linear motion comprises an electromagnet having a coil, a core and an armature able to move linearly along a symmetrical axis of the core, wherein an air gap is formed between the core and the armature. In addition, the air gap exhibits a base and two limbs running symmetrically to the symmetrical axis as well as an essentially frustoconical cross-section in longitudinal section, and the limbs are arranged relative to the core's symmetrical axis so as to form an angle $\alpha$.

The advantage of the present invention lies in the increased area of the air gap and a stronger force thereby developing between the armature and core. The essentially rotationally symmetrical form of the area moreover induces a reduction in the transverse forces engendered by the shape. Although there can be irregularities to the core and/or armature area(s) due to manufacturing tolerances, and thus only partial neutralizing of the transverse forces, such transverse forces are far lower compared to an asymmetrical area. The angle $\alpha$ of the limb relative to the symmetrical axis is in the range of between 30-70°, preferably between 35-65°, particularly 45°-60°. The best result in terms of strong magnetic force can be achieved at 60°.

The electromagnetic drive preferably exhibits a hollow cylindrical and magnetizable or ferromagnetic bar arranged between the coil and core which forms a part of a housing in which the electromagnet is disposed. The bar serves on the one hand as positioning means for the coil as well as for the core and the armature. On the other hand, since the bar is magnetizable, it serves as a bypass for the magnetic field formed within the coil. The integral design of the bar as part of the housing is equally advantageous to the production since additional and complex manufacturing processes are not needed to solder or weld the bar to the housing.

The core advantageously extends over the bar to beyond the outer edge of the housing and closes it off at an upper housing opening as a cover. This advantageously enables the electromagnetic drive to thereby be of compact construction. Additionally, the outwardly extending core serves as a guide for the magnetic field. The magnetic field can thus be explicitly formed and adapted to the application.

The core is advantageously formed so as to form a measuring air gap to an outer side of the bar. Because the bar is magnetizable, part of the magnetic field is conducted through the measuring air gap, the magnetic flux density of which is essentially proportional or similar in spatial dimension to that of the air gap between the core and the armature. This thus creates a reference point not within the coil, in particular between the core and armature.

In a further advantageous embodiment, the electromagnetic drive comprises a magnetic field sensor, in particular a Hall sensor, arranged in the measuring air gap for measuring the magnetic flux density. Due to its ingenious arrangement in the measuring air gap, this has the advantage of the magnetic field sensor being able to measure a proportional magnetic flux density to that from the air gap between the core and armature. By measuring the magnetic field, or its flux density respectively, conclusions can be drawn as to the forces acting on the armature, with same being able to be calculated and regulated.

The electromagnetic drive advantageously comprises a base closure element attached to a bottom side of the housing or closes said bottom side respectively. A space is thereby defined between the base closure element and the core in which the armature can move linearly. Moreover, given the appropriate design, this element can serve either as, like the core, a guide or, like the cover centering element, as a decoupling means of the magnetic field.

In a further advantageous embodiment, the space is filled with a damping fluid, e.g. oil. Thus, the acceleration of the armature due to the magnetic pull and/or a return element such as for example a spring, is attenuated, diminished and/or decelerated.

The core advantageously comprises a passage running along the symmetrical axis in which an armature shaft is and/or can be seated. This thereby enables the possibility of a connection being able to be established between the armature and the outer side of the electromagnetic drive. The symmetrical arrangement of the passage evenly distributes load on the remaining material of the core.

A centering cover element is advantageously arranged on the upper side of the core in order to additionally support the armature shaft and to ensure the armature shaft moves in perfectly linear manner.

In a further advantageous embodiment, an armature shaft is fixed at one end in the armature, whereby the armature shaft extends beyond an upper side of the core and exhibits a spherical bearing element at the other end. Fixing the armature shaft makes it easy to ensure it cannot pull out of the electromagnetic drive. Otherwise, any damping fluids could leak out of the electromagnetic drive via the core's passage. The spherical bearing element serves as a stable head element for a receiving element, e.g. a socket member, and can thereby effect an equal force along the symmetrical axis, e.g. on a valve.

Furthermore, the armature exhibits a lift adjustment means for setting a lifting range of the armature shaft. The advantage of this further development of the invention lies in the fact that the armature shaft does not need to be changed for different applications but instead can be adjusted by the lift adjustment means.

An axle sliding bearing is preferably arranged in the core's passage in order to offset the transverse forces or the magnetic shear forces respectively which arise due to the conical shape of the armature and/or core and to prevent the armature from tilting or bending when moving.

Likewise proving advantageous is for the armature to exhibit passages running parallel to the symmetrical axis which can in each case be closed by closure means, in particular set screws. Particularly when there is damping fluid within the armature, the damping action can be regulated by open and closed passages. The more passages are open, the faster a damping fluid can flow between the space at the lower side of the armature to the space at the upper side of the armature and vice versa. The damping of the armature is at its strongest when all the passages are closed.

A spacer element is preferably arranged at the base of the air gap, particularly a spacer plate, which determines a minimum distance between the core and armature. Since magnetic force increases hyperbolically as the air gap reduces, the maximum force on the armature is limited by a natural obstacle such as the spacer element.

In a further advantageous embodiment, sliding bearings, in particular sintered bearings, are arranged in an armature slot, whereby the armature slot is formed on an outer side and at an edge of the armature adjacent the core. These sliding bearings aid in offsetting the transverse forces occurring due to the conical shape of the core and/or armature and ensure a linear movement of the armature.

In other embodiments, the inventive electromagnetic drive preferably exhibits the following features and dimensionings:

The bar is thin and/or easily magnetizable in such a manner that the bar is very quickly saturated by a given magnetic field. This thereby limits the losses in force formation in the air gap which are inevitable due to the bypass effect of the bar.

In order to offset possible transverse forces and their effects to the greatest extent possible, the lifting axis or armature shaft respectively has a diameter of preferably at least 5 mm or respectively 6 mm, which thereby prevents deflection of the lifting axis and thus any possible tilting of the armature during a linear lifting motion.

The drive according to the invention works unidirectionally; i.e. the armature is not a permanent magnet and the magnetic force can only move the armature in one direction. A spring is preferably configured or arranged externally so as to move the armature into an initial position upon a weak or non-existent magnetic field.

The air gap between the armature and the core is on average 2.5 mm. Since the total travel of the armature shaft amounts to 4 mm, the air gap is 0.5 to 4.5 mm wide.

The armature is fitted with a DU sliding bearing at its outer side so as to better offset the magnetic transverse forces and prevent the armature from contacting the bar.

The centering cover element on the core is a disk made of a non-magnetizable metal, e.g. an aluminum disc, and serves as a magnetic decoupling. Since the magnetic field is not conducted outwardly through the disc, the magnetic field concentrates in the core and does not affect any external elements. Nor can the magnetic field be affected by any external elements.

Similar to the centering cover element, a housing assembly element of the housing acts as an electronics dome and offers protection to the electronics and the internal magnetic field measuring point against external influences such as from e.g. magnetic metals or magnetic fields.

One alternative embodiment of the drive exhibits a different rotationally symmetric form versus the frustoconical form of the core and a diametrically opposite form of the armature, e.g. instead of straight limbs, the limbs are parabolically curved. Additionally or alternatively, there can also be a rotationally symmetrical conical recess or a rotationally symmetrical recess with curved walls in place of the base.

BRIEF DESCRIPTION OF THE DRAWINGS

The following will reference the accompanying schematic figures in describing the invention in greater detail on the basis of example embodiments. Further embodiments of the inventive subject matter within the meaning of the present invention are thereby not to be excluded.

Shown are.

DETAILED DESCRIPTION OF THE EMBODIMENTS

Figure 1:
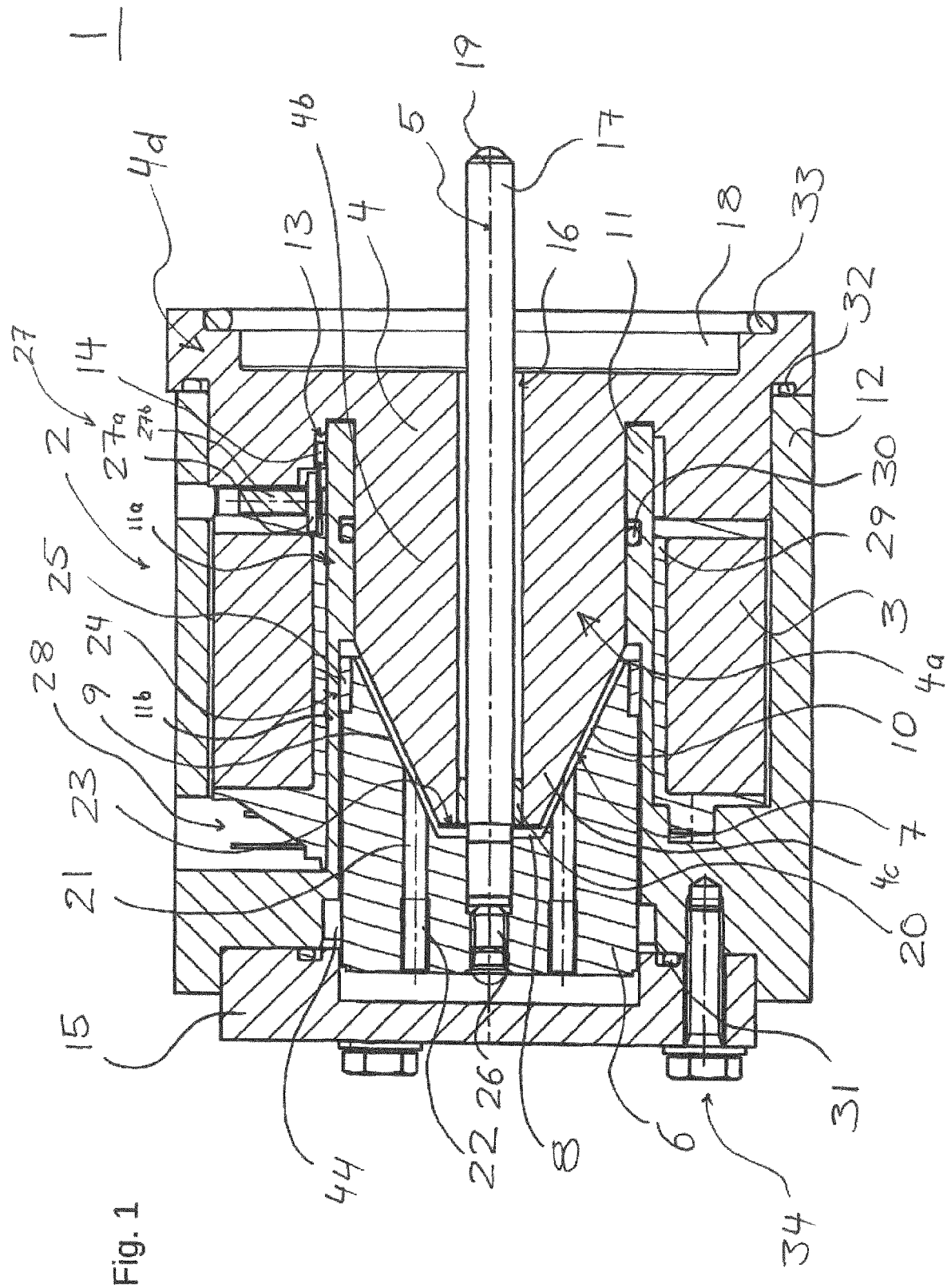
FIG. 1 a cross section of an electromagnetic drive according to a first embodiment.

FIG. 1 shows an electromagnetic drive 1 according to the invention in cross section and having an electromagnet 2 with a coil 3, a core 4 as well as an armature 6. An air gap 7 is formed between the core 4 and the armature 6 which is limited by a surface of the frustoconical or conical core 4 and a diametrically oppositely shaped surface of the armature 6.

The housing 12 of the electromagnetic drive 1 is of a rectangular shape, wherein the housing 12 has a hollow cylindrical bar 11 in the interior. The bar 11 and the housing 12 are formed, in particular turned, from one piece. Furthermore, the bar 11 is open to both the upper side as well as the lower side of the housing 12 and thereby forms a passage between the two opposite sides.

The core 4 exhibits a body 4a which is rotationally symmetric to a symmetrical axis 5 and having a cylinder 4b and a conical truncated cone 4c inserted into the cylindrical interior of the bar 11. So that the core 4 is mounted or fixed at a specific position within the housing 12, in particular the bar 11, a cover element 4d closing the upper side of the housing extends from the rotationally symmetric body 4a of the core 4. The cover element 4d rests on the upper side of the edge of the housing and is fixedly attached to the housing 12 by (non-visible) fastener means. The core 4 is fixed and immovable within the bar 11 at a predetermined position by the body 4a and the cover element 4d. The upper edge of the bar 11 is snugly inserted into the cover element 4d. The cover element 4d is additionally configured such that a circular or annular measuring air gap 13 is formed around the bar 11, in particular between the cover element 4d and the exterior of the bar 11. Furthermore, the cover element 4d is configured so as to prevent the coil 3 from sliding back and forth on the bar 11 and hold it at a predetermined position. The core 4, in particular the body 4a, comprises a passage 16 along the symmetrical axis 5 in which an armature shaft 17 is supported. The truncated cone 4c has a straight base 8 in cross-sectional view and a first and second straight limb 9, 10. The surface area of the base 8 is disc-shaped due to the passage 16.

In the area of the cylinder 4b of the core, the bar 11 exhibits a thick bar wall 11a and, starting from where the truncated cone begins toward the bottom side of the housing 12, a thinner bar wall 11b of lower wall thickness. A projection is thus formed which serves as an additional natural barrier to the traveling range of the armature 6. Moreover, there is less magnetic flux density loss through the bar 11 acting as a bypass due to the thinner wall 11b.

The wires of the coil 3 are wound onto a socket apparatus 29 and connectable to an external power source via a power connection 28. The coil 3 is seated on the bar 11 such that the inner side of the coil 3, in particular the socket apparatus 29, rests on the outer side of the bar 11. The bar 11 thereby forms a bearing for the coil 3 within the housing. Due to the ferromagnetic properties of the bar 11, the bar 11 likewise serves as a bypass for a developing magnetic field inside the coil. In this context, bypass means that parts of the magnetic field are not involved in acting on the air gap between the core and armature but rather are deflected by the bypass, in this case the bar 11.

A disc-shaped base closure element 15 is fixed to the lower side of the housing 12 by fastener means 34, in particular screws. A circular recess having the same diameter as the inner diameter of the bar 11 is formed centrically in the base closure element 15. The recess of the base closure element 15 is furthermore concentrically arranged to the bar 11 so that the armature 6 can move from the interior of the bar 11 into the recess.

The armature 6 is of cylindrical form and has a conical recess at the upper side which is of diametrically opposite configuration to the lower side of the core 4. A plurality of passages 21 run through the armature 6 parallel to the symmetrical axis 5 which can be closed or shut by closure means 22, in particular set screws. A damping fluid able to retard armature 6 acceleration can flow through the passages 21. On the exterior of the armature 6, an armature slot 24 extends from the upper edge directed toward the core 4 and around the entire circumference of the armature 6 in which a sliding bearing 25, in particular a sintered bearing, is arranged. This sliding bearing 25 helps in offsetting the magnetic transverse forces developing through the air gap 7 and prevents the armature 6 from tilting. A passage is formed in the armature 6 which runs along symmetrical axis 5 and in which an armature shaft 17 is fixed with a bearing element 19, in particular a bearing head element. The traveling distance or traveling range of the armature shaft can be preset by means of a lift adjustment means 26 arranged in the armature passage, in particular a setting screw. The armature shaft 17 is supported at the base 8 by an axle bearing 20 arranged in the passage 16 of the core 4. A spacer element 23, in particular a spacer plate, is additionally arranged around the armature shaft 17 on the base 8 in order to define the smallest possible air gap 7 and thus the maximum possible magnetic force on the armature 6. In order to additionally offset the transverse forces, the armature shaft 17 is additionally supported by a centering cover element arranged at the upper side in a recess of the cover element 4d. A sliding bearing 44 is furthermore arranged at the end of the bar 11, in particular at the end of the thin bar wall 11b between the housing 12 and armature 6 directed toward the lower side of the housing.

The space defined between the core 4, the base closure element 15 and the bar 11 is filled with the damping fluid. Annular sealing means are configured to seal the electromagnetic drive 1, in particular a bar sealing ring 30 between the core 4 and the bar 11, a base sealing ring 31 between the base closure element 15 and the housing 12, a core sealing ring 32 between the cover element 4d and the housing 12, and a cover sealing ring 33 between the cover element 4d and an external mountable part such as for example a hydraulic valve housing (including or for example a centering cover element 18).

A magnetic field sensor 14, in particular a Hall sensor, is arranged in the measuring air gap 13 which measures the magnetic field flux density or magnetic field strength respectively in said air gap 13. Due to the arrangement of the measuring air gap 13 and magnetic field sensor 14, the measured magnetic field flux density is proportional to the magnetic field flux density prevailing in the air gap 7. In order to reduce and/or prevent magnetic influences on the sensor 14 signal, a sensor holder 27 with sensor electronics 27a and a sensor plug connector 27b is arranged directly on the sensor 14 at the exterior of the bar 11. The sensor electronics 27a evaluate the signal of the sensor 14 and/or transmit the (evaluated) signal.

Figure 2:
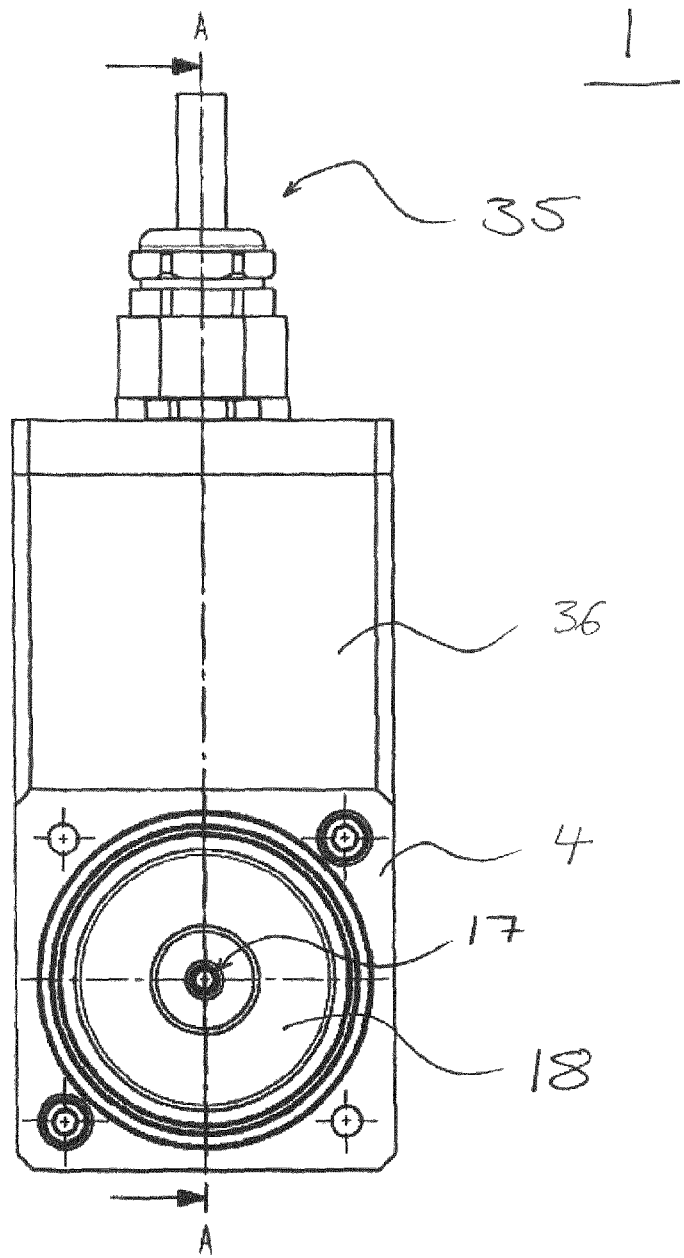
FIG. 2 an exterior view of an electromagnetic drive according to a second embodiment.

FIG. 2 shows a top view of an inventive electromagnetic drive 1 according to a second embodiment. The elements of the second embodiment are substantially identical to the elements of the first embodiment from FIG. 1. The structural and functional differences lie in a housing assembly element 36 (not directly visibly) having an input/output cabling connection 35 (I/O cabling connection) being additionally formed on the housing 12. The armature shaft 17 and the centering cover element 18 are moreover visible in FIG. 2.

Figure 3:
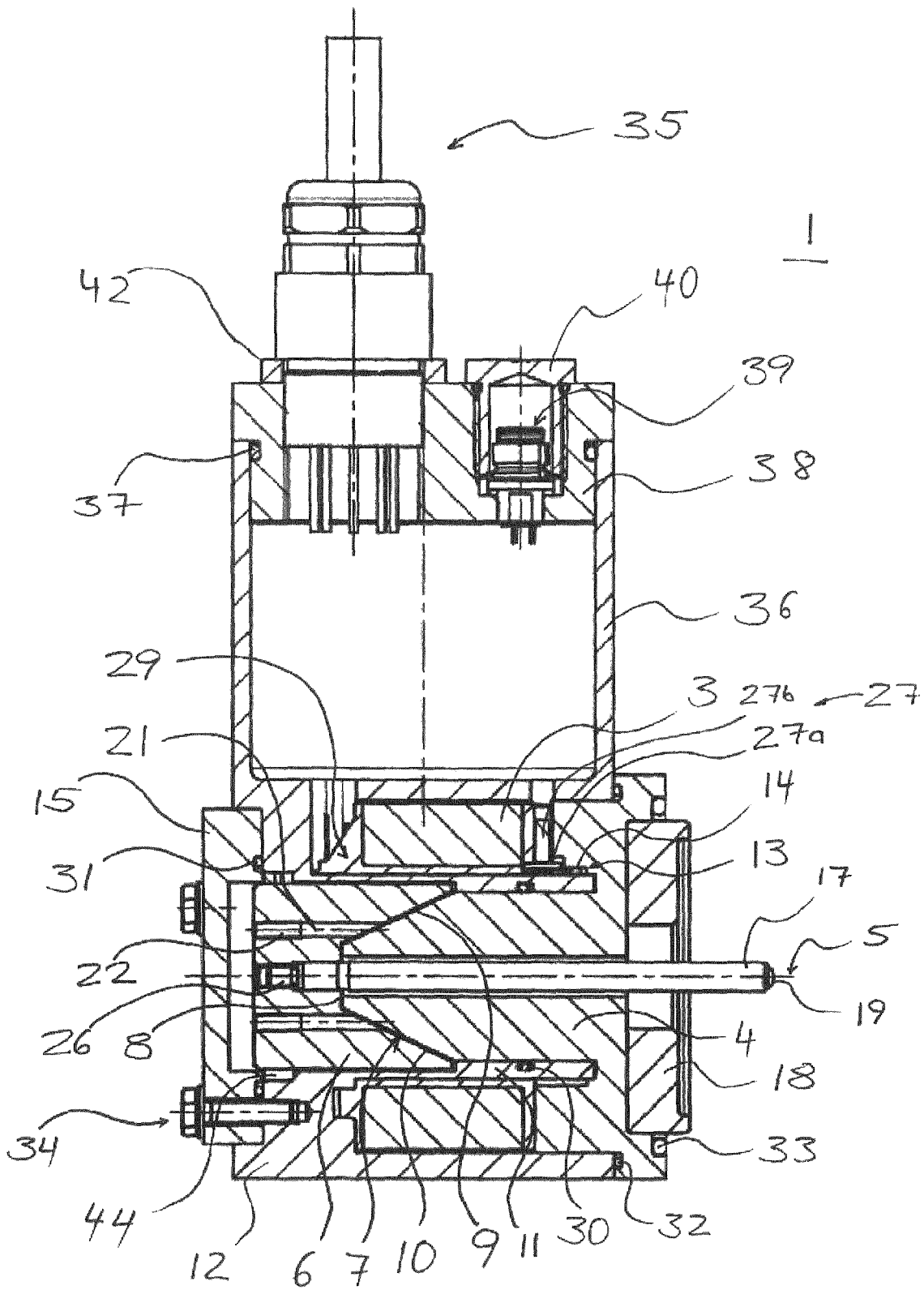
FIG. 3 a cross section of the electromagnetic drive from FIG. 2 along an indicated axis A-A.

FIG. 3 shows a cross section of the electromagnetic drive from FIG. 2 along an axis A-A. The housing assembly element 36 is integrally formed with the housing 4 and can contain additional control and/or analysis electronics for the coil 3 and the magnetic field sensor 14. The housing assembly element 36 is closed by a housing assembly cover element 38 and sealed by a mounting gasket 37 arranged between the two elements 36 and 38. The I/O cabling connection 35 is additionally arranged in the housing assembly cover element 38 with a trim ring 42 and a connector 39 for parameterization and/or bus coupling with a connector covering 40. The armature 6 does not have an armature slot 24 in this embodiment as in FIG. 1.

Figure 4:
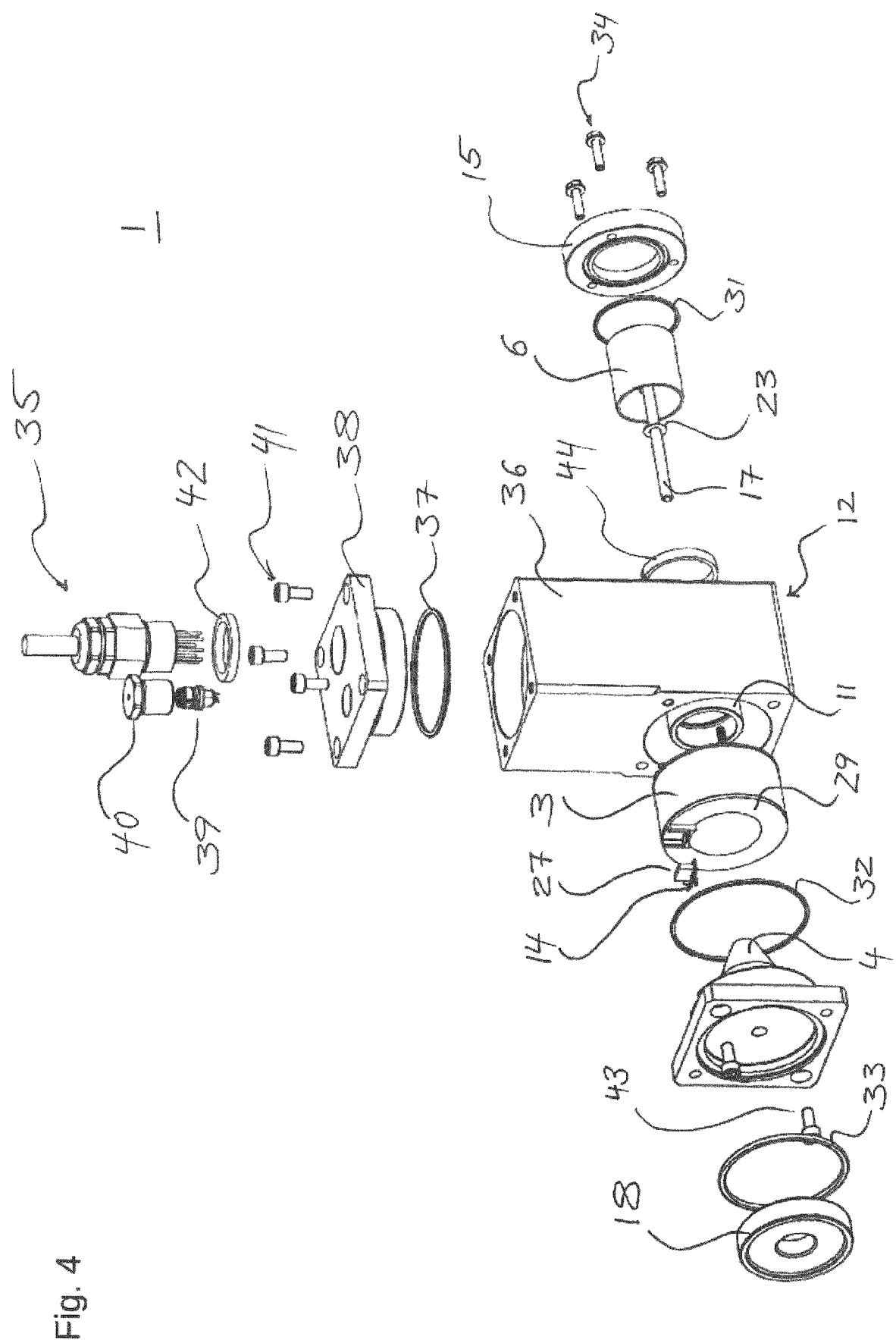
FIG. 4 an exploded view of the electromagnetic drive from FIG. 2.

FIG. 4 shows an exploded view of the electromagnetic drive from FIG. 2. The elements of the electromagnetic drive shown are identical to the elements shown in FIGS. 2 and 3. The rectangular form of the housing 12 with the housing assembly element 36 is clearly identifiable. The socket apparatus 29 of the coil exhibits a recess on the upper side into which the sensor holder 27 of the Hall sensor 14 can be inserted.

LIST OF REFERENCE NUMERALS 1 electromagnetic drive
2 electromagnet
3 coil
4 core
4a rotationally symmetric body (of core)
4b cylinder (of core)
4c conical truncated cone (of core)
4d cover element (of core)
5 symmetrical axis
6 armature
7 air gap
8 base
9 limb
10 limb
11 hollow cylindrical bar
11a thick bar wall
11b thin bar wall
12 housing
13 measuring air gap
14 magnetic field sensor
15 base closure element
16 passage of core
17 armature shaft
18 centering cover element
19 bearing element (bearing head element)
20 axle sliding bearing
21 passage of armature (damping device)
22 closure means (set screws)
23 spacer element (spacer plate)
24 armature slot
25 sliding bearing (sintered bearing)
26 lift adjustment means (setting screw)
27 sensor holder
27a sensor electronics
27b plug connector
28 power connection of coil
29 socket apparatus of coil
30 bar sealing means (bar sealing ring)
31 base closure element sealing means (base sealing ring)
32 core sealing means (core sealing ring)
33 cover sealing means (cover sealing ring)
34 base closure element fastener means (screw)
35 I/O cabling connection (power and/or data connection)
36 housing assembly element (part of housing)
37 housing assembly sealing means (mounting gasket)
38 housing assembly cover
39 connector
40 connector covering
41 housing assembly cover fastener means (screw)
42 trim ring of I/O cabling connection
43 core fastener means (screw)
44 sliding bearing

The invention claimed is:

1. An electromagnetic drive for implementing a linear motion comprising:
   an electromagnet having a coil, a core and an armature able to move linearly along a symmetrical axis of the core, wherein an air gap is formed between the core and the armature, wherein the air gap exhibits a base and two limbs running symmetrically to the symmetrical axis as well as an essentially frustoconical cross-section in longitudinal section, and wherein the limbs are arranged relative to the symmetrical axis of the core so as to form an angle α;
   a hollow cylindrical and magnetizable bar arranged between the coil and the core which forms a part of a housing in which the electromagnet is disposed, wherein the core exhibits a measuring air gap to an outer side of the bar; and
   a magnetic field sensor arranged in the measuring air gap for measuring a magnetic flux density.

2. The electromagnetic drive according to claim 1, wherein the core extends over the bar to an outer edge of the housing and closes off an upper side of the housing as a cover.

3. The electromagnetic drive according to claim 1, wherein the magnetic field sensor is a Hall sensor.

4. The electromagnetic drive according to claim 1, further comprising a base closure element attached to a bottom side of the housing, wherein the armature is linearly movable in a space between the base closure element and the core.

5. The electromagnetic drive according to claim 4, wherein the space is filled with a damping fluid.

6. The electromagnetic drive according to claim 1, wherein the core further comprises a passage running along the symmetrical axis in which an armature shaft is and/or can be seated.

7. The electromagnetic drive according to claim 6, further comprising a centering cover element arranged on an upper side of the core.

8. The electromagnetic drive according to claim 6, wherein the armature shaft is fixed at a first end in the armature, and wherein the armature shaft extends over an upper side of the core and exhibits a spherical bearing element at a second end.

9. The electromagnetic drive according to claim 8, further comprising a lift adjustment means arranged in the armature for setting a lifting range of the armature shaft.

10. The electromagnetic drive according to claim 6, further comprising an axle sliding bearing arranged in the passage.

11. The electromagnetic drive according to claim 1, wherein the armature exhibits passages running parallel to the symmetrical axis which can in each case be closed by a closure means.

12. The electromagnetic drive according to claim 11, wherein the closure means is a set screw.

13. The electromagnetic drive according to claim 1, further comprising a spacer element arranged in the base of the air gap which determines a minimum distance between the core and the armature.

14. The electromagnetic drive according to claim 13, wherein the spacer element is a spacer plate.

15. The electromagnetic drive according to claim 1, further comprising a sliding bearing arranged in an armature slot, wherein the armature slot is formed on an outer side and at an edge of the armature adjacent the core.

16. The electromagnetic drive according to claim 15, wherein the sliding bearing is a sintered bearing.

* * * * *